United States Patent [19]
Christensen et al.

[11] Patent Number: 5,720,358
[45] Date of Patent: Feb. 24, 1998

[54] APPARATUS FOR CONTROLLING THE TORQUE ON A POWER TRAIN AND METHOD OF OPERATING THE SAME

[75] Inventors: Steven V. Christensen, Peoria; Andrew O. Fonkalsrud, Yorkville, both of Ill.

[73] Assignee: Caterpillar Inc., Peoria, Ill.

[21] Appl. No.: 569,408

[22] Filed: Dec. 6, 1995

[51] Int. Cl.$^6$ ................................................. B60K 41/00
[52] U.S. Cl. ........................ 180/53.4; 364/424.083; 477/110
[58] Field of Search ...................... 180/53.4, 53.7, 180/53.8; 364/424.083; 477/54, 110, 111

[56] References Cited

U.S. PATENT DOCUMENTS

| | | | |
|---|---|---|---|
| 3,913,419 | 10/1975 | Sale et al. | 477/54 |
| 4,136,751 | 1/1979 | Poore et al. | 180/53.8 X |
| 4,651,846 | 3/1987 | Headrick | 180/53.4 X |
| 5,056,615 | 10/1991 | Duthie et al. | 180/53.4 X |
| 5,305,213 | 4/1994 | Boardman et al. | 364/424.083 |
| 5,457,633 | 10/1995 | Palmer et al. | 364/431.09 |

Primary Examiner—Kevin Hurley
Attorney, Agent, or Firm—David M. Masterson

[57] ABSTRACT

An apparatus and method for controlling the torque on the power train of a machine is disclosed. The power train includes an engine and a torque converter. The machine includes a work implement that is moveable in response to the actuation of a plurality of hydraulic cylinders. An electronic controller determines an optimal engine speed based on the actual engine speed, torque converter output speed, and the fluid pressure associated with the hydraulic cylinders. The optimal engine speed is used to govern the speed of the engine to control the power train torque.

14 Claims, 3 Drawing Sheets

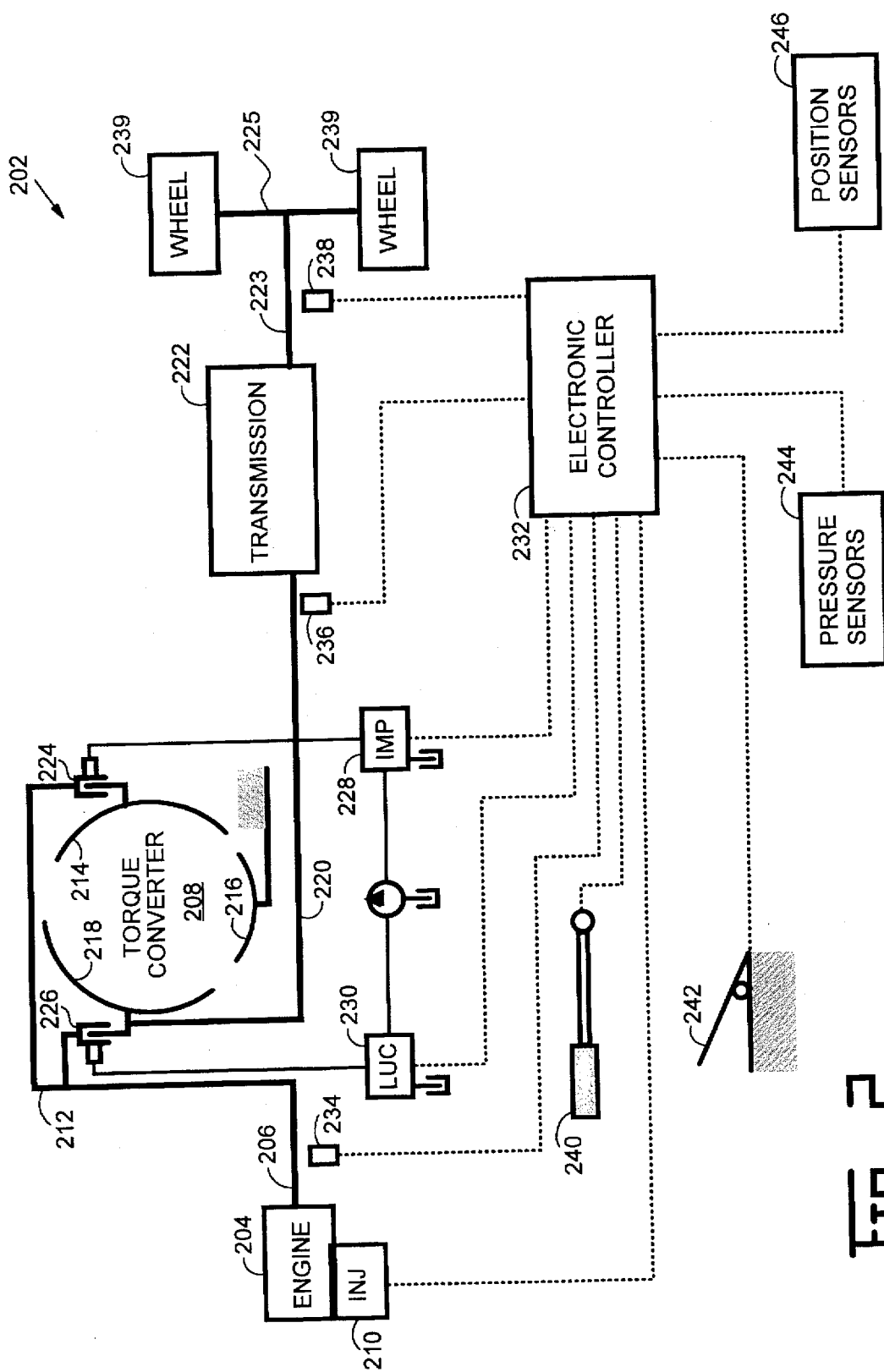

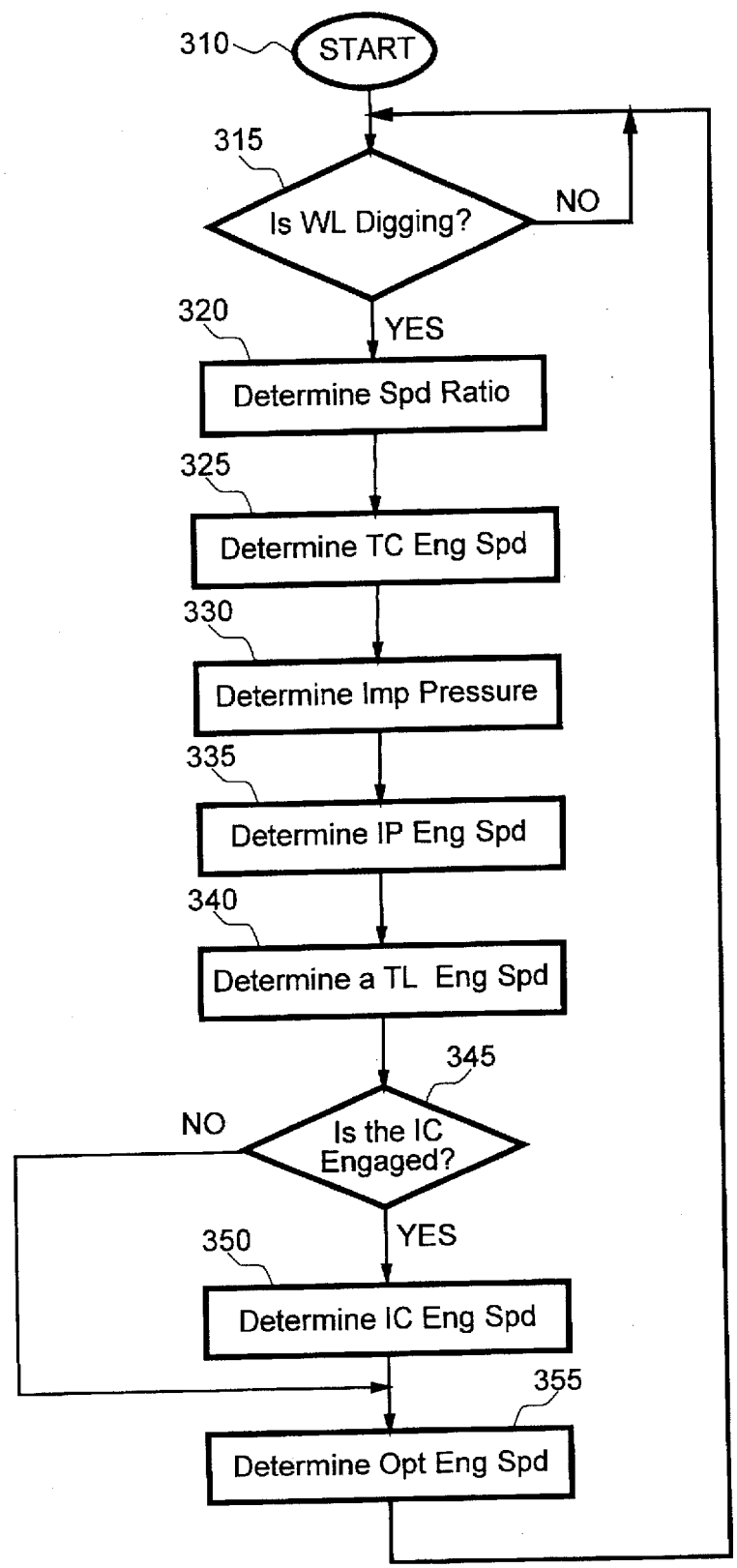
Fig_3_

5,720,358

APPARATUS FOR CONTROLLING THE TORQUE ON A POWER TRAIN AND METHOD OF OPERATING THE SAME

TECHNICAL FIELD

This invention relates generally to a method for controlling the torque on a power train and, more particularly, to a method that limits the power train torque in response to hydraulic system power requirements.

BACKGROUND ART

In heavy equipment and other machinery having a power train including an engine, torque converter, transmission, driveshaft, differential, axle shaft, and/or final drive it is important to match the power output of the engine with the torque capability of the power train components. For example, if the engine produces power above the rating of the power train components, then the power train components may deteriorate and fail sooner than expected. However, selecting power train components with a power rating that exceeds the power output of the engine and torque converter increases the cost of the power train components. Thus, it is advantageous to match the power output of the engine and torque converter closely to the torque ratings of the power train components.

As is known in the art, the maximum torque output of the torque converter varies with engine speed and with output speed of the torque converter. The torque produced within the transmission and other power train components is a function of the engine speed, torque converter output speed and transmission gear ratio. Ideally, the transmission should be selected so that its components can accept the maximum torque output of the torque converter. However, the maximum torque output may occur over a narrow band of engine output speeds or in a specific gear ratio. At other speeds or in other gear ratios, the torque on the transmission components may be less. For those speeds and gear ratios it would be possible to select less expensive components. Thus, for some applications, it may be preferable to limit the amount of power the engine can produce during certain gear selections and speeds in order to reduce the maximum torque on the transmission and power train components. This, in turn, will permit the use of less expensive transmission components.

Prior art controllers are known which limit the engine power output based on gear selection of the transmission. Such controllers may perform satisfactorily on vehicles and other equipment without other systems requiring engine power. For example, on wheel loaders and other equipment with earth moving implements, the implement is typically powered by a hydraulic system that is powered by the engine. In those cases, the power produced by the engine may be demanded by the hydraulic system and not the transmission. Thus, there may be instances when full engine power might damage the transmission components if all of the power is applied to the transmission. However, if the engine power is, at least in part, being diverted to the hydraulic system, then full engine power might be appropriate. Prior art controllers that limit engine power, do not consider hydraulic system power requirements.

DISCLOSURE OF THE INVENTION

An apparatus and method for reducing the torque on the power train of a machine is disclosed. The power train includes an engine and a torque converter. The machine includes a work implement that is moveable in response to the actuation of a plurality of hydraulic cylinders. A controller determines an optimal engine speed based on the actual engine speed, torque converter output speed, and the fluid pressure associated with the hydraulic cylinders. The optimal engine speed is used to govern the speed of the engine to control the power train torque.

BRIEF DESCRIPTION OF THE DRAWINGS

For a better understanding of the present invention, reference may be made to the accompanying drawings in which:

FIG. 2 shows a block diagram of a power train of the wheel loader; and

FIG. 3 shows a block diagram of the program control utilized to limit the power train torque.

BEST MODE FOR CARRYING OUT THE INVENTION

Figure 1:
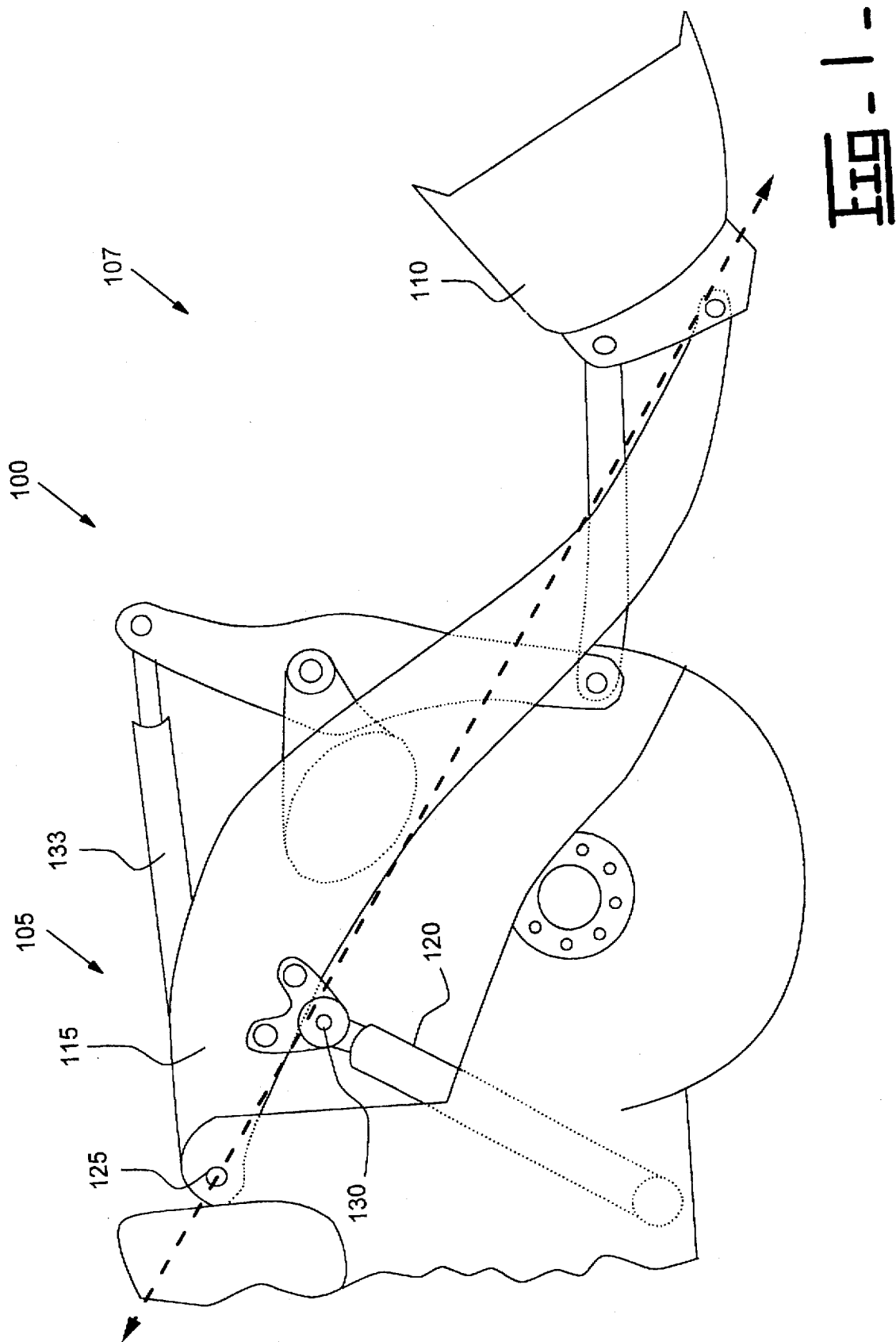
FIG. 1 shows a wheel loader and the corresponding bucket linkage.

The present invention is directed toward controlling the power train torque on an earth working machine 100, such as a wheel loader 105 shown in FIG. 1. Although a wheel loader is shown, it is noted that the present invention is equally applicable to machines such as track type loaders, integrated tool carriers, and other machines. In FIG. 1, a forward portion of a wheel-type loader 105 having a work implement 107 is illustrated. Note that the illustrated work implement assembly is just one example of a work implement assembly for a wheel loader. The work implement 107 includes a bucket 110 that is connected to a lift arm assembly or linkage 115 that is pivotally actuated by two hydraulic lift cylinders 120 (only one of which is shown) about a pair of lift arm pivot pins 125 (only one shown) attached to the machine frame. A pair of lift arm load bearing pivot pins 130 (only one shown) are attached to the lift arm assembly and the lift cylinders. The bucket is also tilted or racked by a bucket tilt cylinder 133 about a pair of bucket pivot pins 135 (only one shown).

A power train 202 for the machine is illustrated in FIG. 2. The power train 202 includes an engine 204 having a shaft 206 connected to a hydrodynamic torque converter 208. For example, the engine 204 may include a plurality of solenoid operated fuel injectors that are used to control the amount of fuel delivered to the engine. The torque converter 208 includes a rotating housing 212, an impeller element 214, a reactor element 216, and a turbine element 218 that is connected to a centrally located output shaft 220. The output shaft 220 provides the input to a multi speed transmission 222. The output of the transmission rotates a drive shaft 223 that is rotatably connected to an axle 225 that drives a set of drive wheels 239.

The power train 202 may also include a disc-type input clutch or impeller clutch 224 that is located between the engine 204 and the torque converter 208 for controllably coupling the rotating housing to the impeller element, and a disc-type lockup clutch 226 for selectively coupling the rotating housing to the turbine element and the output shaft for a direct mechanical connection that effectively bypasses the torque converter. An electrohydraulic impeller clutch valve 228 provides fluid flow to actuate the impeller clutch, while an electrohydraulic lockup clutch valve 230 provides fluid flow to actuate the lockup clutch. Although the present invention is described in relation to an impeller clutch, those skilled in the art will recognize that the present invention is equally applicable to other types of torque converter assemblies.

An electronic controller 232 is provided to control the operation of the power train. The electronic controller 232 may include one or more control modules to control the operation of the power train. Preferably, the electronic controller 232 includes a microprocessor. It is noted that the term microprocessor is meant to include microcomputers, microprocessors, integrated circuits and the like capable of being programmed. The electronic controller contains sufficient electronic circuitry to convert input signals from a plurality of sensors, make several computations based on the input signals, and generate output signals with sufficient power to drive a plurality of solenoids for actuating the fuel injectors 210, the impeller clutch 224, and the lockup clutch 226. Preferably, the microprocessor is programmed with a plurality of preselected logic rules for producing one or more output signals in response to receiving one or more input signals.

The electronic control module automatically receives several signals pertaining to the operation of the power train. An engine speed sensor 234 produces an engine speed signal that is responsive to the flywheel rotation or a gear that is mounted on the camshaft. A torque converter speed sensor 236 produces a torque converter speed signal that is responsive to the rotational speed and direction of the torque converter output shaft. A travel speed sensor 238 produces a machine travel speed signal that is responsive to the transmission output speed.

An operator control handle 240 is included for selectively controlling the operation of the transmission. The control handle generates transmission control signals to the electronic controller that is indicative of a desired gear ratio and/or direction of the machine. An operator impeller pedal 242 is provided for selectively controlling the degree of engagement of the impeller clutch. The impeller pedal is rockable about a transversely oriented pivot pin. As the pedal is depressed from an elevated position to an intermediate position, the ability of the impeller clutch 224 to transmit torque to the impeller element 214 from the engine is proportionately reduced. When depressed, the impeller pedal generates an impeller control signal to the electronic controller proportional to the pedal position.

The electronic controller also receives position signals produced by position sensors 246 that measure the position of the work implement 100. For example, the position sensors 246 may include displacement sensors that sense the amount of cylinder extension in the lift and tilt hydraulic cylinders respectively. The work implement 100 position may also be derivable from the work implement joint angle measurements. Thus, an alternative device for producing a work implement position signal includes rotational angle sensors such as rotatory potentiometers, for example, which measure the rotation of one of the lift arm pivot pins from which the geometry of the lift arm assembly or the extension of the lift cylinders can be derived. The work implement position may be computed from either the hydraulic cylinder extension measurements or the joint angle measurement by trigonometric methods.

Finally, the electronic controller receives pressure signals produced by pressure sensors 244 that measure the force exerted on the work implement 100. The pressure sensors sense the hydraulic pressures in the lift and tilt hydraulic cylinders and produce signals responsive to the pressures of the respective hydraulic cylinders. For example, the cylinder pressure sensors may sense the lift and tilt hydraulic cylinder head and rod end pressures, respectively. It is noted that the pressure sensors may equally sense the pressure of the variable displacement pump that delivers pressurized fluid to the hydraulic cylinders.

The present invention is now discussed in relation to a high level block diagram shown in FIG. 3, which illustrates the program control that is resident in the software of the electronic controller. Accordingly, the program control is used to determine an optimal engine speed at which to regulate the speed of the engine in order to control the power train torque. Program control begins at block 310 and passes to block 315. At block 315 the electronic controller determines if the wheel loader is digging. The wheel loader is said to be digging, for purposes of the present invention, if three conditions occur:

1. the operator has selected the first gear forward shift position;
2. the work implement is at a digging position; and
3. the machine travel speed is less than a predetermined speed.

One method for determining whether the work implement is at a digging position is by measuring the lift cylinder position to determine whether the lift linkage is at an altitude that is equal to or less than a horizontal reference line. For example, an implement reference line that is defined by the lift arm pivot pin 125 and the bucket pivot pin 135 is used to represent the lift linkage. The implement reference line is shown in phantom in FIG. 1.

If the above conditions occur, then the wheel loader is assumed to be digging and program control passes to block 320. At block 320, the electronic controller determines the ratio of the torque converter output speed to the engine speed. Then, at block 325, the electronic controller determines desired engine speed based on the torque converter speed ratio. This desired engine speed is known as a torque converter (TC) engine speed. For example, a software look-up table is stored in memory where the table contains a plurality of speed ratio values that correspond to a plurality of TC engine speed values. Consequently, a TC engine speed value is selected based on the speed ratio value. The selected TC engine speed value represents a desired engine speed that corresponds to a desired maximum drive train torque based on the torque converter output speed. The values contained in the look-up table may be based on empirical data, mathematical equations, or other such means. Moreover, the TC engine speed value may additionally be determined in response to a mathematical equation that is based on empirical data.

Program control continues to block 330, where the electronic controller determines the hydraulic fluid pressure required by the work implement. For example, the electronic controller receives signals indicative of the fluid pressures associated with the hydraulic cylinders, and determines the required implement pressure. For example, the required implement pressure may be set equal to the greater of the fluid pressures associated with the hydraulic cylinders, or the pump pressure. Then, at block 335, the electronic controller determines an implement pressure (IP) engine speed based on the required implement pressure. The IP engine speed represents a desired engine speed that corresponds to a maximum drive train torque based on the actual engine speed and implement pressure. Preferably, a mathematical equation is used to determine the IP engine speed, although a software look-up table may equally be used.

Program control continues to block 340, where the electronic controller determines a torque limiting (TL) engine speed based on the TC and IP engine speeds. For example, the electronic controller determines which of the two determined engine speeds are the lessor value and chooses that value as the TL engine speed. Thus, the present invention accounts for the hydraulic system power when determining the TL engine speed so that the engine can produce a maximum power to result in maximum productivity. However, if the impeller clutch is being utilized to limit the drive line torque, then the TL speed calculated above, may not be needed.

Consequently, at block 345, the electronic controller determines if the impeller clutch is engaged, and if so, control passes to block 350 where the electronic controller determines the impeller clutch (IC) engine speed based on the impeller clutch pressure. For example, a software look-up table is stored in memory that contains a plurality of impeller clutch pressure values that correspond to a plurality of IC engine speed values. The IC engine speed correlates the drive line torque carrying capacity of the impeller clutch with an equivalent drive line torque that would be produced by the engine. The correlation is needed because the IC engine speed is used in direct comparison with the TL engine speed. Thus, at block 355, the electronic controller compares the TL engine speed with the IC engine speed, and determines an optimal engine speed based on the two engine speed values. For example, if the IC engine speed is found to be less than the TL engine speed, then the optimal engine speed set equal to the desired engine speed as defined by the operator. If, however, the IC engine speed is found to be greater than the TL engine speed, then the optimal engine speed is set to the TL engine speed. The optimal engine speed is then used as the desired engine speed at which to regulate the speed of engine.

Thus, while the present invention has been particularly shown and described with reference to the preferred embodiment above, it will be understood by those skilled in the art that various additional embodiments may be contemplated without departing from the spirit and scope of the present invention.

We claim:

1. A method for controlling the torque on the power train of a machine, the power train including an engine and a torque converter, the method comprising the steps of:
   sensing the output speed of the torque converter and responsively producing a torque converter speed signal;
   sensing the speed of the engine and responsively producing an engine speed signal;
   receiving the torque converter and engine speed signals, determining the ratio of the torque converter output speed to the engine speed, and determining a TC engine speed which represents a desired engine speed based on the torque converter speed ratio; and
   determining an optimal engine speed in response to the torque converter speed ratio, and regulating the speed of the engine at the optimal speed to control the power train torque.

2. A method, as set forth in claim 1, wherein the machine includes a work implement that is moveable in response to the actuation of a plurality of hydraulic cylinders, including the steps of:
   sensing the hydraulic pressure associated with respective hydraulic cylinders and responsively producing respective pressure signals; and
   receiving the pressure signals and determining an IP engine speed which represents a desired engine speed based on the hydraulic cylinder pressures.

3. A method, as set forth in claim 2, including the steps of:
   comparing the TC engine speed with the IP engine speed; and
   determining a TL engine speed in response to the lessor of the TC and IP engine speeds.

4. A method, as set forth in claim 3, wherein the torque converter has a rotating housing and an impeller element, and the power train includes an impeller clutch for connecting the impeller element to the rotating housing, the method including the steps of:
   determining whether the impeller clutch is engaged;
   determining an IC engine speed which represents a desired engine speed based on the amount of impeller clutch engagement; and
   determining the optimal engine speed in response to the TL and IC engine speeds.

5. A method for controlling the torque on the power train of a machine, the power train including an engine and a torque converter, the machine including a work implement that is moveable in response to the actuation of a plurality of hydraulic cylinders, the method comprising the steps of:
   determining whether the machine is digging;
   sensing the hydraulic pressure associated with respective hydraulic cylinders and responsively producing respective pressure signals;
   sensing the output speed of the torque converter and responsively producing a torque converter speed signal;
   sensing the speed of the engine and responsively producing an engine speed signal; and
   receiving the pressure, torque converter and engine speed signals, determining an optimal engine speed and regulating the speed of the engine at the optimal speed to control the power train torque in response to the machine digging.

6. A method, as set forth in claim 5, wherein the steps of determining whether the machine is digging, includes the steps of:
   determining whether the transmission is engaged in first forward gear;
   determining whether the work implement is at a digging position; and
   determining whether the machine travel speed is less than a predetermined speed.

7. A method, as set forth in claim 6, including the steps of:
   determining the ratio of the torque converter output speed to the engine speed; and
   determining a TC engine speed which represents a desired engine speed based on the torque converter speed ratio.

8. A method, as set forth in claim 7, including the step of determining an IP engine speed which represents a desired engine speed based on the hydraulic cylinder pressures.

9. A method, as set forth in claim 8, including the steps of:
   comparing the TC engine speed with the IP engine speed; and
   determining a TL engine speed in response to the lessor of the TC and IP engine speeds.

10. A method, as set forth in claim 9, wherein the torque converter has a rotating housing and an impeller element, and the power train includes an impeller clutch for connecting the impeller element to the rotating housing, the method including the steps of:
    determining whether the impeller clutch is engaged;
    determining an IC engine speed which represents a desired engine speed based on the amount of impeller clutch engagement; and determining the optimal engine speed in response to the TL and IC engine speeds.

11. An apparatus for controlling the torque on the power train of a machine, the power train including an engine and a torque converter, the machine including a work implement that is moveable in response to the actuation of a plurality of hydraulic cylinders, comprising:

a plurality of pressure sensors for sensing the hydraulic pressure associated with respective hydraulic cylinders and responsively producing respective pressure signals;

a torque converter speed sensor for sensing the output speed of the torque converter and responsively producing a torque converter speed signal;

an engine speed sensor for sensing the speed of the engine and responsively producing an engine speed signal;

an electronic controller for receiving the pressure, torque converter and engine speed signals, determining an optimal engine speed, and regulating the speed of the engine at the optimal speed to control the power train torque.

12. An apparatus, as set forth in claim 11, including a travel speed sensor that senses the transmission output speed and responsively produces a machine travel speed signal.

13. An apparatus, as set forth in claim 12, including a plurality of position sensors that senses the position associated with the work implement and responsively produces respective position signals.

14. An apparatus, as set forth in claim 13, wherein the electronic controller receives the position and travel speed signals, determines if the machine is digging, and responsively determines the optimal engine speed.

* * * * *